UNITED STATES PATENT OFFICE.

ERNST FUSSENEGGER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

AZO DYES AND PROCESS OF MAKING THE SAME.

1,034,898. Specification of Letters Patent. Patented Aug. 6, 1912.

No Drawing. Application filed April 18, 1912. Serial No. 691,699.

*To all whom it may concern:*

Be it known that I, ERNST FUSSENEGGER, subject of the Emperor of Austria-Hungary, residing at Ludwigshafen-on-the-Rhine, Germany, have invented new and useful Improvements in Azo Dyes and Processes of Making the Same, of which the following is a specification.

I have found that by combining the diazo compound obtainable from 4-chlor-2-aminophenol (or a substitution product thereof) with a sulfonic acid of 1.8-acidyl-aminonaphthol, coloring matters can be obtained which, upon subsequent treatment with a bichromate, give rise to beautiful violet-blue to blue shades of excellent fastness against the action of light, fulling, potting, carbonizing, and sulfur, and which also have good equalizing power.

My new coloring matters are characterized by yielding red to violet-red solutions in water, from red to blue solutions in sodium bicarbonate solution and from blue to violet-red solutions in concentrated sulfuric acid. They dye wool directly from Bordeaux to red shades which on treatment with bichromate turn from blue to violet-blue. On gently reducing with stannous chlorid they give rise to a 4-chlor-2-aminophenol body and a monoacidyl-diaminonaphthol-sulfonic acid.

The following example will serve to illustrate further the nature of my invention, but it is not confined to this example. The parts are by weight. Neutralize, with sodium bicarbonate, the diazo compound obtained from 143.5 parts of 4-chlor-2-aminophenol and introduce it into a concentrated solution of 405 parts of the disodium salt of 1.8.3.6-acetyl-amino-naphthol-disulfonic acid. Continue stirring at ordinary temperature until the combination is complete, and then filter off the coloring matter (after adding, if necessary, some common salt) and press and dry it.

If desired, the combination can be carried out in acetic acid solution or in alkaline solution, instead of in neutral solution.

In an analogous manner, coloring matters can be obtained by employing a derivative of 4-chlor-2-aminophenol, such for instance as a sulfonic acid thereof, and further instead of employing 1.8.3.6-acetyl-aminonaphthol-disulfonic acid, other sulfonic acid of a 1.8-acidyl-aminonaphthol can be employed.

The following shades are obtainable from some of the dyes made in accordance with my invention:—

| Coloring matter from— | Shades obtained by— | |
|---|---|---|
| | Direct dyeing. | After-treatment with bichromate. |
| 4-chlor-2-aminophenol + 1.8.5-acetyl-aminonaphthol-sulfonic acid. | Bordeaux | Violet-blue. |
| 4-chlor-2-aminophenol + 1.8.3.6-acetyl-aminonaphthol-disulfonic acid. | Bordeaux | Navy blue. |
| 4-chlor-2-aminophenol+2'.4'. dichlorbenzoyl-aminonaphthol-disulfonic acid (1.8.4.6). | Red | Violet-blue. |
| 4-chlor-2-aminophenol-6-sulfonic acid + 1.8.5-acetylaminonaphthol-sulfonic acid. | Bordeaux | Navy blue. |

Now what I claim is:—

1. The process of producing azo coloring matters by combining a diazotized 4-chlor-2-aminophenol body with a sulfonic acid of 1.8-acidyl-amino-naphthol.

2. The process of producing azo coloring matter by combining 4-chlor-2-diazophenol with 1-acetyl-amino-8-naphthol-3.6-disulfonic acid.

3. The new azo coloring matters which can be obtained by combining a diazotized 4-chlor-2-aminophenol body with a sulfonic acid of 1.8-acidyl-aminonaphthol which coloring matters yield red to violet red solutions in water, from red to blue solutions in sodium bicarbonate solution and from blue to violet-red solutions in concentrated sulfuric acid, they dye wool directly from Bordeaux to red shades which on treatment with bichromate turn from blue to violet-blue, and on gentle reduction with stannous chlorid give rise to a 4-chlor-2-aminophenol body and a mono-acidyl-diaminonaphthol-sulfonic acid.

4. The new azo coloring matter which can be obtained by combining 4-chlor-2-diazophenol with 1-acetyl-amino-8-naphthol-3.6-disulfonic acid, which coloring matter yields a carmine red solution in water, a violet solution in sodium bicarbonate solution, a blue solution in concentrated sulfuric acid and dyes wool directly Bordeaux shades, which shades on treatment with bichromate turn navy-blue, which coloring matter on gentle reduction with stannous chlorid gives rise to 4-chlor-2-aminophenol and amino-1-acetylamino-8-naphthol-3.6-disulfonic acid.

In testimony whereof I have hereunto set my hand in the presence of two subscribing witnesses.

ERNST FUSSENEGGER.

Witnesses:
JOS. HEIFFER,
ERNEST F. EHRHARDT.